(12) United States Patent
Daniel

(10) Patent No.: US 11,646,634 B1
(45) Date of Patent: May 9, 2023

(54) TWO SPEED GEARBOX

(71) Applicant: Omni Powertrain Technologies, LLC, Houston, TX (US)

(72) Inventor: Craig Daniel, Honolulu, HI (US)

(73) Assignee: Omni Powertrain Technologies, LLC, Houston, TX (US)

( * ) Notice: Subject to any disclaimer, the term of this patent is extended or adjusted under 35 U.S.C. 154(b) by 0 days.

(21) Appl. No.: 18/074,413

(22) Filed: Dec. 2, 2022

Related U.S. Application Data

(60) Provisional application No. 63/285,675, filed on Dec. 3, 2021.

(51) Int. Cl.
*H02K 7/116* (2006.01)

(52) U.S. Cl.
CPC .................................. *H02K 7/116* (2013.01)

(58) Field of Classification Search
CPC ......... H02K 7/116; F16H 3/087; F16H 3/089; B60K 6/36
USPC ....................................................... 310/67 R
See application file for complete search history.

(56) References Cited

U.S. PATENT DOCUMENTS

| | | | |
|---|---|---|---|
| 8,523,734 B2 * | 9/2013 | Mepham | B60L 50/62 475/5 |
| 9,657,822 B2 * | 5/2017 | Park | F16H 3/005 |
| 10,315,747 B1 * | 6/2019 | Jaszewski | B63H 20/002 |
| 10,336,379 B2 * | 7/2019 | Milton | F16H 57/025 |
| 10,384,535 B2 * | 8/2019 | Isono | B60K 17/046 |
| 10,589,797 B2 * | 3/2020 | Milton | B60K 1/00 |
| 2007/0180941 A1 * | 8/2007 | Mowbray | B63H 20/14 74/335 |
| 2010/0120580 A1 * | 5/2010 | Mepham | B60L 50/16 477/3 |
| 2017/0067560 A1 * | 3/2017 | Takahashi | F16H 63/18 |
| 2017/0356531 A1 * | 12/2017 | Villarreal | F16H 61/66272 |
| 2020/0171938 A1 * | 6/2020 | Ishibashi | G01L 3/109 |

* cited by examiner

*Primary Examiner* — Alex W Mok
(74) *Attorney, Agent, or Firm* — Haynes and Boone, LLP

(57) ABSTRACT

A two-speed electric drive assembly for vehicles includes a main driveshaft driven by a first axial flux motor where the main driveshaft extends coaxially through a hollow assist driveshaft driven by a second axial flux motor. The main driveshaft includes a main gear that is continuously meshed with an intermediate gear on an intermediate driveshaft. A freewheel gear is mounted around the hollow assist driveshaft and can be selectively coupled and decoupled with the hollow assist driveshaft by a shift mechanism. The freewheel gear is continuously meshed with an intermediate gear on the intermediate driveshaft. Another intermediate gear affixed to the intermediate driveshaft is continuously meshed with an output gear affixed to an output driveshaft. The two-speed electric drive assembly can selectively switch between speed mode and torque mode without torque interrupt.

20 Claims, 11 Drawing Sheets

TWO SPEED GEARBOX

PRIORITY CLAIM

This application claims the benefit of priority to U.S. Provisional Application No. 63/285,675, filed Dec. 3, 2021, the benefit of which is claimed and the disclosure of which is incorporated by reference in its entirety.

FIELD OF THE INVENTION

The present disclosure generally relates to transmission assemblies for electric vehicles, and more particularly to a two-speed gearbox for use with axial flux electric motors.

BACKGROUND OF THE INVENTION

In common prior art vehicle drive systems, there is often a torque interrupt when shifting from one gear to another gear as a first gear is disengaged from a drive gear and then a second gear is engaged with the drive gear. This often manifests in a brief slowdown of the vehicle speed. Moreover, for electrically driven drive systems, another source of torque interrupt arises from the time the transmission control unit ("TCU") and in particular, the time it takes to transmit a control signal from the TCU to a motor controller and any other electronic components functioning in concert with the electric motor. It will be appreciated that in such electrically driven drive systems, software that integrates the various separate electric components typically must manage requests and validations between these electronic components before implementing any action. This coordination between separate electronic components adds to computation and reaction time of the components, and in the case of electric drive systems, again can result in brief slowdown of the vehicle speed, and hence torque interruption. Thus, there is a desire to reduce torque interrupt, permitting faster shifting between gears.

Moreover, where such drive systems are driven by an electric motor, between disengaging the first gear and end engaging the second gear, it is necessary to bleed off power from the system using the electric motor, briefly turning the electric motor into a generator. In this regard, the amount of energy required to slow down the rotor of an electric motor is proportional to the mass, and hence inertia, of the rotor. As the electric motor is turned into a generator, the overall system must absorb and disburse or otherwise dampen any energy pulse that arises from the slowing rotor. This energy pulse can damage various electronic components of the system if it is not properly handled. Thus, there is a desire to mitigate this energy pulse during gear shifts.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which:

FIG. 2 is a perspective view of the two-speed electric drive assembly of FIG. 1a.

FIG. 3 is a perspective view of the gearbox of the two-speed electric drive assembly of FIG. 1a.

FIG. 4 is a perspective view of one embodiment of a shift mechanism utilized in the two-speed electric drive assembly of FIG. 1a.

FIG. 5 is an exploded perspective view of one embodiment of an axial flux electric motor used in the two-speed electric drive assembly of FIG. 1a.

DETAILED DESCRIPTION OF THE DISCLOSURE

Disclosed herein is a vehicle electric drive assembly having first and second axial flux motors and four driveshafts, namely a main driveshaft, a hollow assist driveshaft, an intermediate driveshaft and an output driveshaft. The main driveshaft is coaxial with the hollow assist driveshaft and extends through the hollow assist driveshaft. The intermediate driveshaft is spaced apart from the main driveshaft and hollow assist driveshaft. The output driveshaft is spaced apart from the intermediate driveshaft. In some embodiments, the output driveshaft may be colinear with the main driveshaft and hollow assist driveshaft. Mounted along the intermediate driveshaft are three gears, namely a first intermediate gear, a second intermediate gear, and a third intermediate gear. A main gear is mounted on the main driveshaft, and the first axial flux motor is coupled to the main driveshaft to drive the main gear. An assist gear is mounted along the hollow assist driveshaft and rotatable relative to the hollow assist driveshaft whereby the assist gear can be engaged and disengaged with the hollow assist driveshaft. The second axial flux motor is coupled to the hollow assist driveshaft and drives the hollow assist driveshaft. Finally, an output gear is mounted on the output driveshaft. The assist gear is permanently meshed with the first intermediate gear of the intermediate driveshaft, the main gear is permanently meshed with the second intermediate gear of the intermediate driveshaft, and the output gear is permanently meshed with the third intermediate gear of the intermediate driveshaft. In one or more embodiments, the electric drive assembly may also include a shift mechanism mounted adjacent the hollow assist driveshaft and actuatable to engage and disengage the assist gear with the hollow assist driveshaft. In a first power mode, the first axial flux motor may drive the main gear, transferring power to the output gear via the second and third intermediate gears. In a second power mode, the first axial flux motor operates as in the first power mode but the assist gear is engaged with the hollow assist driveshaft and driven by the second axial flux motor, thereby transferring power to the output gear via each of the first, second and third intermediate gears. In a third power mode, the first axial flux motor may be allowed to freewheel, utilizing only the second axial flux motor to transfer power to the output gear via the first and third intermediate gears.

Figure 1A:
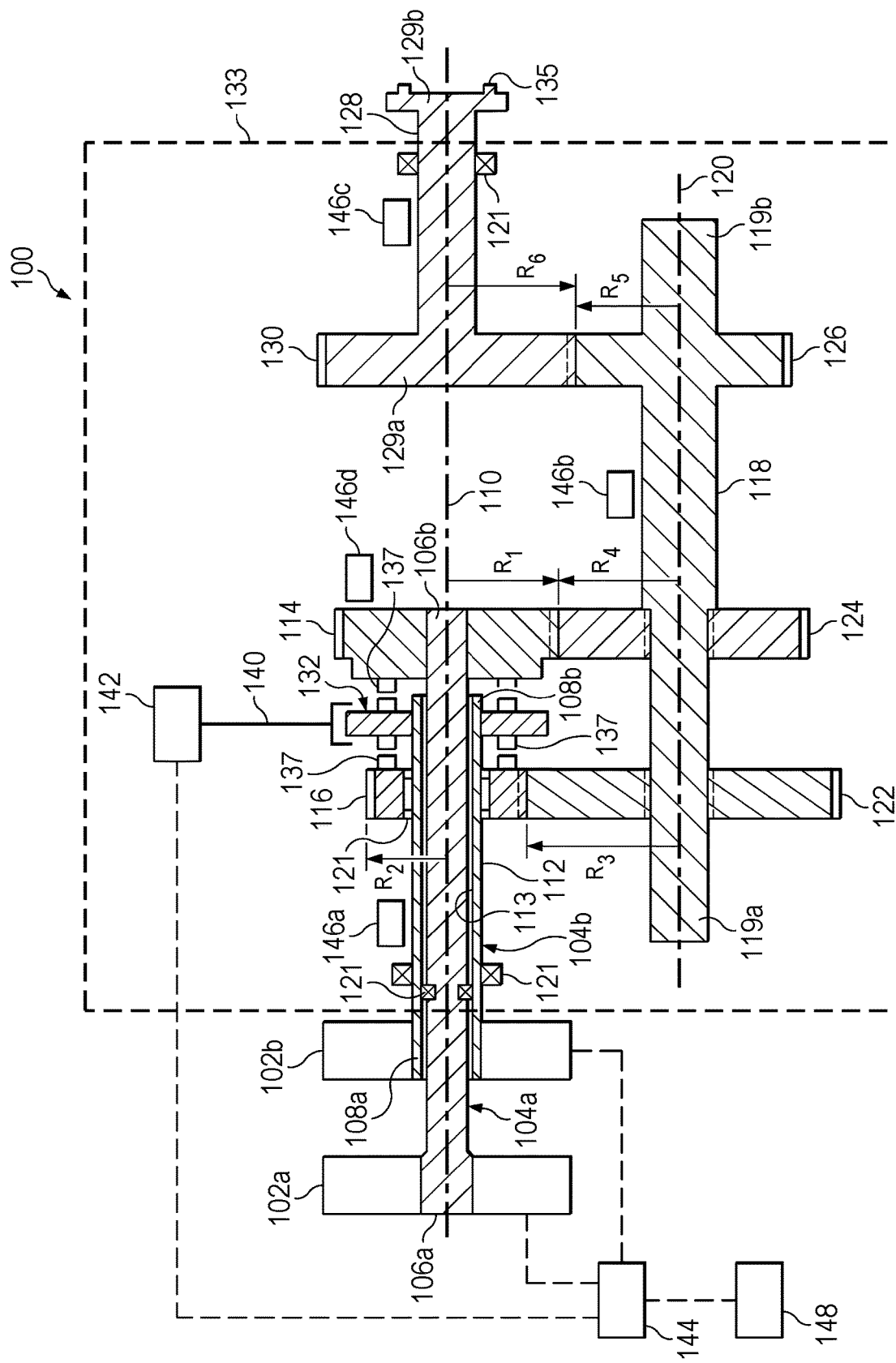
FIG. 1a is a schematic view of one embodiment of a two-speed electric drive assembly where the assist gear is a freewheel gear.

With reference to FIG. 1a, an electric drive assembly 100 is provided that is employs two axial flux motors 102a, 102b and a gearing arrangement to mitigate torque interrupt arising. A first axial flux motor 102a is coupled to and drives a main or first driveshaft 104a extending along a first axis 110. A main gear 114 is disposed along the main driveshaft 104a. The main gear 114 may be integrally formed with the main driveshaft 104a, or alternatively, the main gear 114 may be attached to the main driveshaft 104a so as to rotate with the main driveshaft 104a. In one or more embodiments, the main gear 114 is fixed to the main driveshaft 104a. In any event, the main driveshaft 104a has a first end 106a and a second end 106b. In one or more embodiments, main gear 114 is mounted at the second end 106b of the main driveshaft 104a, and the first axial flux motor 102a engages the first end 106a of the main driveshaft 104a. As used herein, an axial flux motor refers to an electric device with at least one rotor and corresponding stator spaced apart from one another axially along a driveshaft axis. Such motors typically incorporate magnets that are positioned in planes parallel to the coils. Moreover, as used herein, two-speed refers to a gearbox or transmission with 2 different ratios.

A second axial flux motor 102b drives an assist or second driveshaft 104b. In one or more embodiments, the second axial flux motor 102b is adjacent the first axial flux motor 102a. In any event, assist driveshaft 104b has a first end 108a and a second end 108b with an inner bore 113 passing therethrough between the first end 108a and the second end 108b such that assist driveshaft 104b is hollow along the length of assist driveshaft 104b. Assist driveshaft 104b also has an outer driveshaft surface 112. An assist gear 116 is disposed along the outer driveshaft surface 112 of the assist driveshaft 104b. The assist driveshaft 104b is coupled to the second axial flux motor 102b at the first end 108a of the assist driveshaft 104b. The main driveshaft 104a extends axially through the assist driveshaft 104b so as to be coaxial therewith along first axis 110. In one or more embodiments, the assist gear 116 is mounted along the assist driveshaft 104b adjacent the outer driveshaft surface 112 and rotatable relative to the assist driveshaft 104b. As such, the assist gear 116 may freewheel relative to the assist driveshaft 104b when not coupled to the assist driveshaft 104b. In other words, the assist gear 116 is mounted along the assist driveshaft 104b but rotatable independently of the assist driveshaft 104b when not coupled thereto by shift mechanism 132 described below.

In one embodiment, assist gear 116 may be supported on outer driveshaft surface 112 of assist driveshaft 104b by bearings 121 that allow assist gear 116 to freewheel, i.e. rotate independently of assist driveshaft 104b. Likewise, bearings 121 may be affixed within inner bore 113 of assist driveshaft 104b to support main driveshaft 104a and allow main driveshaft 104a to rotate independently of assist driveshaft 104b.

Because the main driveshaft 104a and the assist driveshaft 104b are coaxial, with the assist driveshaft 104b being a hollow driveshaft having a through-bore through which the main driveshaft 104a extends, the first and second axial flux motors 102a, 102b, respectively, can be positioned adjacent one another while the two driveshafts 104a, 104b, respectively, can rotate independently of one another.

Spaced apart from main driveshaft 104a and assist driveshaft 104b is an intermediate or third driveshaft 118 that extends along a second axis 120. In one or more embodiments, second axis 120 is parallel with but spaced apart from the first axis 110 such that intermediate driveshaft 118 is parallel with main driveshaft 104a and assist driveshaft 104b. Intermediate driveshaft 118 has a first end 119a and a second end 119b.

Positioned along the intermediate driveshaft 118 is a first intermediate gear 122, a second intermediate gear 124, and a third intermediate gear 126. As shown, in one or more embodiments, first intermediate gear 122 is mounted adjacent the first end 119a of intermediate driveshaft 118, third intermediate gear 126 is mounted adjacent the second end 119b of intermediate driveshaft 118 and second intermediate gear 124 is mounted on intermediate driveshaft 118 between first intermediate gear 122 and third intermediate gear 126. In other embodiments, the first intermediate gear 122, second intermediate gear 124, and third intermediate gear 126 may be mounted on the intermediate shaft 118 in another order. For example, in one or more embodiments, the third intermediate gear 126 may be positioned between the first intermediate gear 122 and the second intermediate gear 124, in which case, output driveshaft 128 may be spaced apart from each of the first axis 110 and the second axis 120 in order to accommodate an output gear 130 that is permanently meshed with the third intermediate gear 126.

As shown in FIG. 1a, first intermediate gear 122 is permanently meshed with the assist gear 116 so that the first intermediate gear 122 and the assist gear 116 are in constant engagement with one another. Likewise, second intermediate gear 124 is permanently meshed with main gear 114 so that the second intermediate gear 124 and the main gear 114 are in constant engagement with one another.

Electric drive assembly 100 also includes an output or fourth driveshaft 128. As shown in FIG. 1a, output driveshaft 128 is radially spaced apart from intermediate driveshaft 118. In one or more embodiments, output driveshaft 128 may extend along first axis 110 so as to be colinear with main driveshaft 104a and assist driveshaft 104b, but in such case, output driveshaft 128 is axially spaced apart from main driveshaft 104a and assist driveshaft 104b. In other embodiments, output driveshaft 128 may extend along a third axis (not shown) separate from first axis 110 and second axis 120. In any event, output driveshaft 128 has a first end 129a and a second end 129b with an output gear 130 mounted on the output driveshaft 128 between the two ends 129a, 129b, and coupled to the third intermediate gear 126 carried by intermediate driveshaft 118. More specifically, output gear 130 is permanently meshed with third intermediate gear 126 so that the third intermediate gear 126 and the output gear 130 are in constant engagement with one another. In one embodiment, output gear 130 is mounted adjacent the first end 129a of output driveshaft 128 and a drive flange 135 is mounted adjacent the second end 129b of output driveshaft 128.

As used herein, "permanently meshed" means that two gears are in constant engagement or continuously meshed with one another during operation of electric drive assembly 100. In this regard, all intermediate gears described herein, namely first intermediate gear 122, second intermediate gear 124 and third intermediate gear 126 are permanently meshed with their respective gears simultaneously during operation of electric drive assembly 100. It should be noted that because the various gears are in constant engagement as described herein, the axial and radial spacing between the various driveshafts, namely the first driveshaft 104a, the second driveshaft 104b, the third driveshaft 118 and the fourth driveshaft 128, may be fixed. In other words, all of the driveshafts may be axially and radially fixed relative to one another, thereby minimizing the size of a gearbox housing 133 disposed to encase the gears and driveshafts. Specifically shown in FIG. 1a is first driveshaft 104a and second driveshaft 104b extending through gearbox housing 133 so that first and second axial flux motors 102a, 102b are external of gearbox housing 133. Likewise, fourth driveshaft 128 extends through gearbox housing 133 so that drive flange 135 is also external of gearbox housing 133.

In the illustrated embodiment, main gear 114 has a first radius R1; assist gear 116 has a second radius R2; first intermediate gear 122 has a third radius R3; second intermediate gear 124 has a fourth radius R4; third intermediate gear 126 has a fifth radius R5; and output gear 130 has a sixth radius R6. It will be appreciated that the various radii of the gears may be selected to achieve a particular gearing ratio, and the disclosure in not limited to particular gearing ratios. However, in some embodiments, R3 is greater than R4, which is greater than R5 and R6 is greater than R1 which is greater than R2.

In the embodiment of FIG. 1a, gears 114, 116, 122, 124, 126 and 130 are generally depicted as spur gears, but may be other types of gears as well, such as, but not limited to helical gears. In one or more embodiments, output gear 130, main gear 114 and first intermediate gear 122 are bull gears, being larger in diameter than the gears to which each is continuously meshed.

It will be appreciated that so long as the various gears are permanently meshed and transfer power as described herein, the specific physical arrangement of the gears and driveshafts relative to one another is not limited by this disclosure. For example, the output driveshaft 128 may be positioned along a different axis than the first axis 110. Moreover, the output driveshaft 128 may be adjacent the axial flux motors 102, in which case, the third intermediate gear 126 may be positioned at the first end 119a of intermediate driveshaft 118 with second intermediate gear 124 positioned at the second end 119b of intermediate driveshaft 118. Similarly, while the gears depicted herein are shown as spur gears and the various driveshafts are parallel to one another, in other embodiments, the gears may be other types of gears so that the driveshafts may be angled relative to one another. For example, third intermediate gear 126 may be a bevel gear and output gear 130 may be bevel gear such that output driveshaft 128 is perpendicular to intermediate driveshaft 118. Finally, unlike the prior art, with these fixed components, neither gears nor driveshaft are "shifted" in the sense of being physically moved to change gears. Rather, the electric drive assembly 100 experiences a gear transition between torque mode and power mode utilizing the described gearing arrangement.

Electric drive assembly 100 also includes a shift mechanism 132 disposed to at least couple and decouple assist gear 116 with assist driveshaft 104b. Although not limited to a particular mechanism or device, in one or more embodiments, shift mechanism 132 may include cooperating elements 137 that engage with cooperating elements on assist gear 116. In some embodiments, shift mechanism 132 may include an axially slidable dog ring or shift sleeve 132b (see FIG. 4). In one or more embodiments, shift mechanism 132 is adjacent assist gear 116. In this regard, shift mechanism 132 may be disposed along first axis 110 and positioned between the main gear 114 and the assist gear 116 in order to at least couple the assist gear 116 to the assist driveshaft 104b as desired. For example, shift mechanism 132 may be mounted on assist driveshaft 104b and coupled thereto so that rotation of the assist driveshaft 104b rotates the shift mechanism 132. In any event, shift mechanism 132 may be disposed to engage and disengage the assist gear 116 in order to couple and decouple the assist gear 116 and the assist driveshaft 104b, respectively. In other embodiments, shift mechanism 132 may be disposed to alternately engage either the assist gear 116 or the main gear 114. Where shift mechanism 132 is disposed to engage either assist gear 116 or main gear 114, the shift mechanism 132 can be moved to work together with the main gear 114 for increased speed or with assist gear 116 for increased torque from electric drive assembly 100.

As shown in FIG. 1a, an actuator 142 may be utilized to move shift mechanism 132 to engage and disengage gears as desired. In some embodiments, shift mechanism 132 may include a linkage 140 that urges shift mechanism 132 between engaged and disengaged positions. In one or more embodiments, actuator 142 is an electric actuator mechanism.

Shift mechanism 132 may be utilized to allow second axial flux motor 102b to be utilized in conjunction with first axial flux motor 102a, or vice versa, without resulting in torque interrupt. In one illustrative example, first axial flux motor 102a drives main gear 114, which in turn rotates intermediate second driveshaft 118 via second intermediate gear 124 with which main gear 114 is continuously meshed. The rotating intermediate second driveshaft 118 drives first intermediate gear 122 which is continuously meshed with assist gear 116 mounted about assist driveshaft 104b. Notably, assist gear 116 is mounted about assist driveshaft 104b so as to spin freely or independently thereof when not coupled to assist driveshaft 104b by shift mechanism 132. For example, first axial flux motor 102a may operate at a select first speed $RPM_1$ that results in rotation of assist gear 116 at an assist gear speed $RMP_a$. Second axial flux motor 102b need not be in operation while first axial flux motor 102a is in operation. In order to allow second axial flux motor 102b to be utilized in conjunction with first axial flux motor 102a, second axial flux motor 102b is utilized to rotate assist driveshaft 104b and thereby rotate shift mechanism 132 affixed to assist driveshaft 104b. The second motor 102b is operated at a second speed $RPM_2$ selected so that shift mechanism 132 rotates at the same speed as assist gear speed $RMP_a$. In other words, first and second axial flux motors 102a, 102b are operated at speeds that allow the rotational speed of the shift mechanism 132 to match or otherwise be synchronized with the rotation speed $RMP_a$ of the assist gear 116, at which point, the shift mechanism 132 may be actuated so that shift mechanism 132 engages assist gear 116, thereby coupling assist gear 116 to assist driveshaft 104b. Thereafter, second axial flux motor 102b can be utilized to provide additional torque to output driveshaft 128, or alternatively, first and second axial flux motors 102a, 102b can be adjusted to achieve a desired torque-speed output for electric drive assembly 100. This arrangement allows second axial flux motor 102b to be engaged to assist in driving output driveshaft 128 without any torque interrupt, and specifically, without the need to disengage any gears. Thus, power can be maintained during the entire process.

To assist in matching speeds as described above, one or more speed sensors 146 may be disposed adjacent at least one of the driveshafts or gears to monitor the rotational speed of the driveshaft and/or gears. In the illustrated embodiment, a speed sensor 146a is shown adjacent assist driveshaft 104b, a speed sensor 146b is shown adjacent intermediate driveshaft 118, a speed sensor 146c is shown adjacent output driveshaft 128 and a speed sensor 146d is shown adjacent main driveshaft 104a. Persons of skill in the art will appreciate that such speed sensors 146 may be positioned to measure the rotational speed of a driveshaft or of a gear mounted on the driveshaft. Moreover, while four speed sensors 146 are shown for some embodiments, in other embodiments, only two sensors 146 need be utilized to measure the relative RPMs resulting from the first and second axial flux motors 102*a*, 102*b*. Alternatively, without the need for speed sensors 146 at all, the speed of the second axial flux motor 102*b* may be adjusted based on the known speed of the first axial flux motor 102*a* and the known geometry of the various shafts and gears.

Figure 1B:
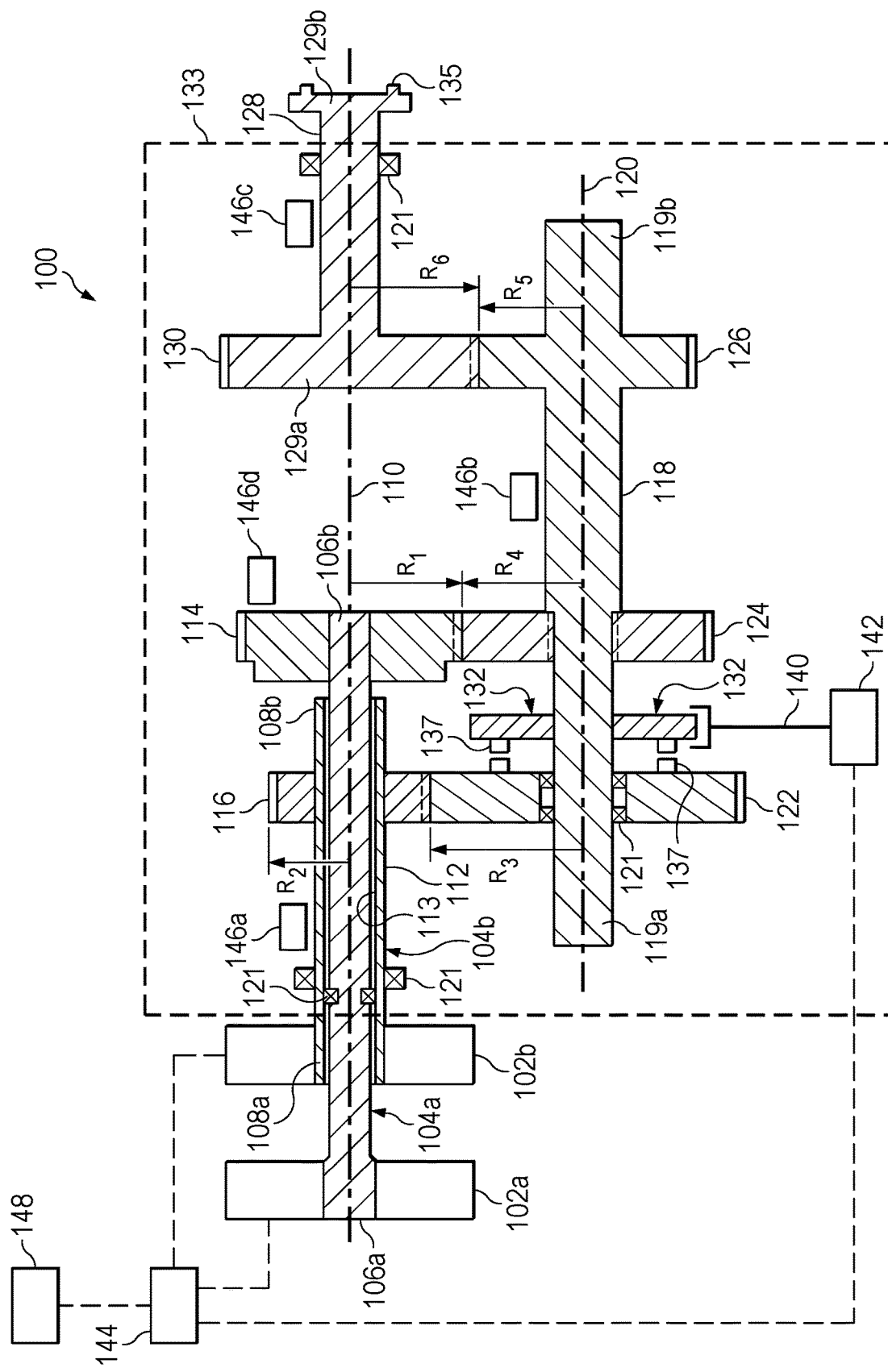
FIG. 1B is a schematic view of an embodiment of a two-speed electric drive assembly where an intermediate gear is a freewheel gear.

In one or more other embodiments as shown in FIG. 1B, rather than utilizing assist gear 116 on assist driveshaft 104*b* as the "freewheel" gear, and continuously engaging fixed first intermediate gear 122 mounted on the intermediate driveshaft 118, the relative positions of these two meshed gears may be reversed. Specifically, assist gear 116 may be a fixed gear mounted on assist driveshaft 104*b* and first intermediate gear 122 may be a freewheel gear disposed about intermediate driveshaft 118. In such case, first intermediate gear 122 rotates about second axis 120 independently of intermediate driveshaft 118. It will be appreciated that in this embodiment, shift mechanism 132 is positioned adjacent first intermediate gear 122 in order to couple and decouple first intermediate gear 122 with intermediate driveshaft 118. In this regard, shift mechanism 132 may move axially along second axis 120. Bearings 121 may be utilized between first intermediate gear 122 and intermediate driveshaft 118 to allow independent rotation of first intermediate gear 122 relative to intermediate driveshaft 118.

Figure 1C:
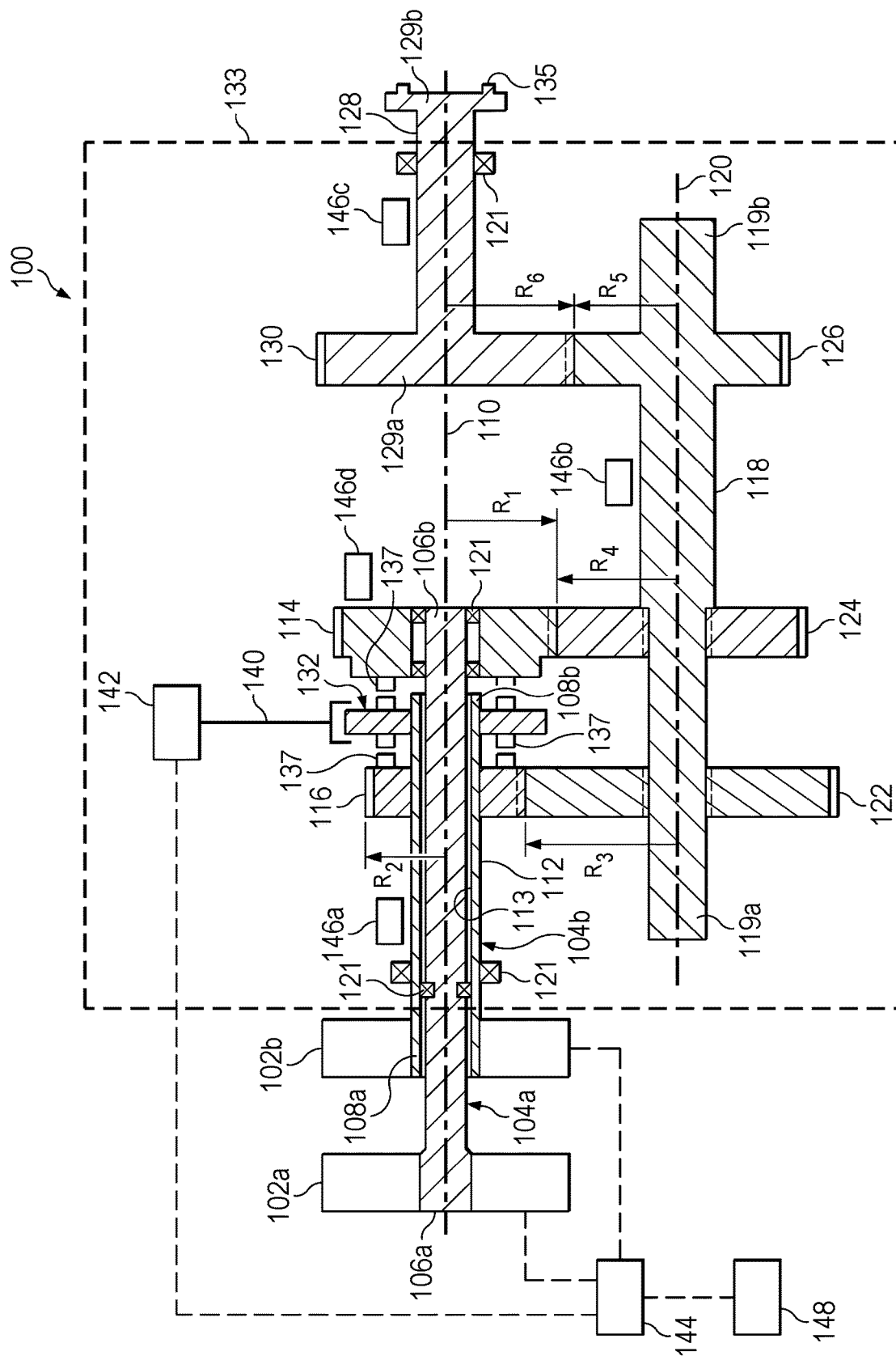
FIG. 1c is a schematic view of one embodiment of a two-speed electric drive assembly where the main gear is a freewheel gear.

In one or more other embodiments as shown in FIG. 1c, rather than utilizing assist gear 116 on assist driveshaft 104*b* as the "freewheel" gear, assist gear 116 may be a fixed gear mounted on assist driveshaft 104*b* and main gear 114 disposed about main driveshaft 104*a* may be utilized as the freewheel gear. In such case, main gear 114 rotates about first axis 110 independently of main driveshaft 104*a*. It will be appreciated that in this embodiment, shift mechanism 132 is positioned adjacent main gear 114 in order to couple and decouple main gear 114 with main driveshaft 104*a*. Bearings 121 may be utilized between main gear 114 and main driveshaft 104*a* to allow independent rotation of main gear 114 relative to main driveshaft 104*a*.

Figure 1D:
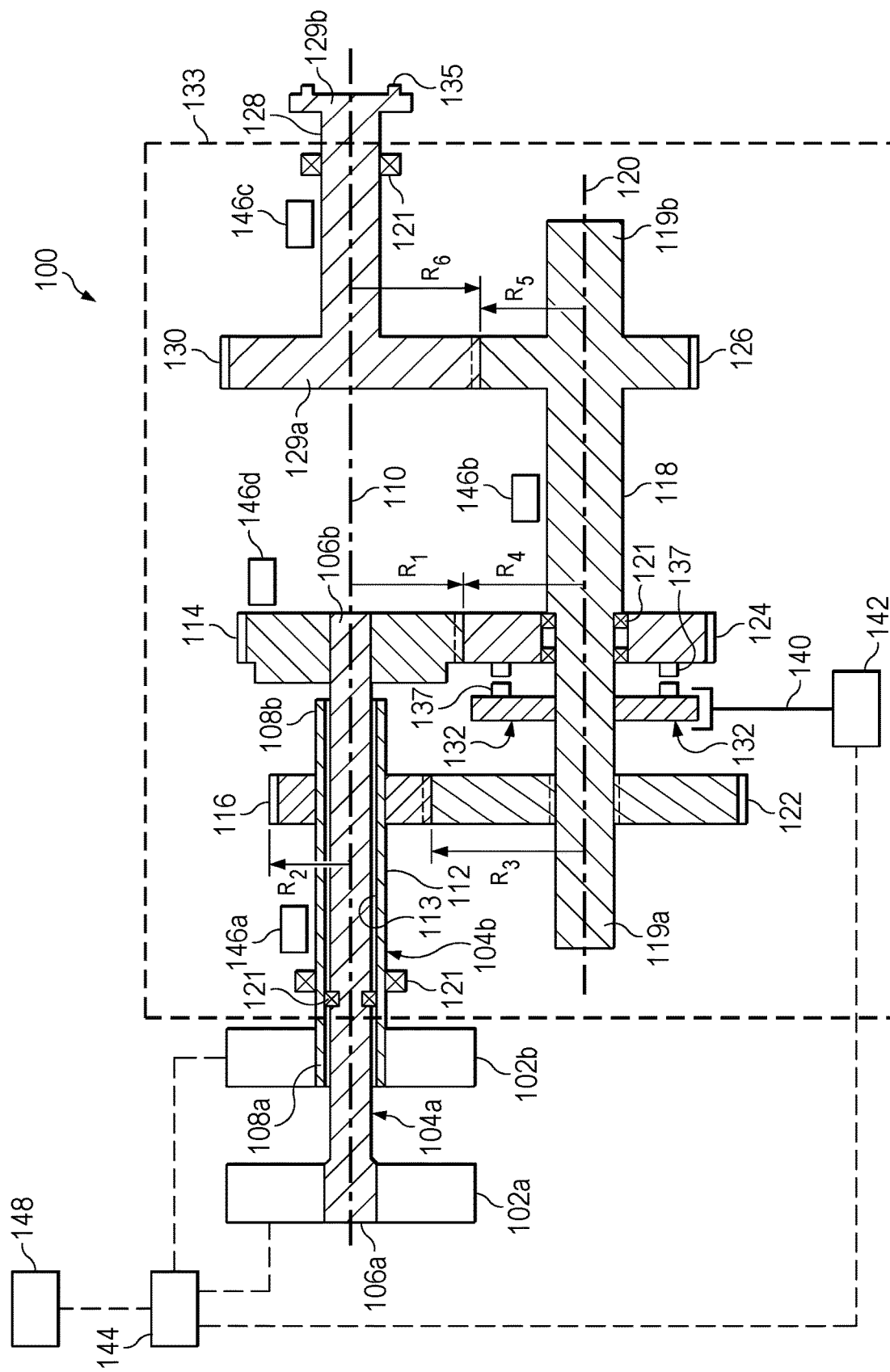
FIG. 1d is a schematic view of another embodiment of a two-speed electric drive assembly where an intermediate gear is a freewheel gear.

In one or more other embodiments as shown in FIG. 1d, rather than utilizing main gear 114 on main driveshaft 104*a* as the "freewheel" gear that continuously meshes with a fixed gear 124 mounted on intermediate driveshaft 118, the relative positions of these two meshed gears may be reversed. Specifically, main gear 114 may be a fixed gear mounted on main driveshaft 104*a* and second intermediate gear 124 may be a freewheel gear disposed about intermediate driveshaft 118. In such case, second intermediate gear 124 rotates about second axis 120 independently of intermediate driveshaft 118. It will be appreciated that in this embodiment, shift mechanism 132 is positioned adjacent second intermediate gear 124 in order to couple and decouple second intermediate gear 124 with intermediate driveshaft 118. In this regard, shift mechanism 132 may move axially along second axis 120. Bearings 121 may be utilized between second intermediate gear 124 and intermediate driveshaft 118 to allow independent rotation of second intermediate gear 124 relative to intermediate driveshaft 118.

Thus, based on the foregoing, the various embodiments generally include four optional positions for the freewheel gear and two optional positions for the shift mechanism 132. In this regard, the electric drive assembly 100 can be said to include a main driveshaft 104*a*, an assist driveshaft 104*b*, an intermediate driveshaft 118 and an output driveshaft 128. A main gear 114 is disposed along the main driveshaft 104*a*; an assist gear 116 is disposed along the assist driveshaft 104*b*; first, second and third intermediate gears 122, 124, 126, respectively, are disposed along the intermediate driveshaft 118 and spaced apart from one another; and an output gear 130 is affixed to the output driveshaft 128. The main gear 114 is continuously meshed with the second intermediate gear 124; the assist gear 116 is continuously meshed with the first intermediate gear 122; and the output gear 130 is continuously meshed with the third intermediate gear 126 which third intermediate gear is fixed to the intermediate driveshaft 118. One of the main gear 114, assist gear 116, first intermediate gear 122 or second intermediate gear 124 is a freewheel gear disposed to be rotatable independently from the driveshaft about which it is mounted. A shift mechanism is disposed adjacent this freewheel gear and axially movable to couple and decouple the freewheel gear and the driveshaft about which it is mounted.

Figure 2:
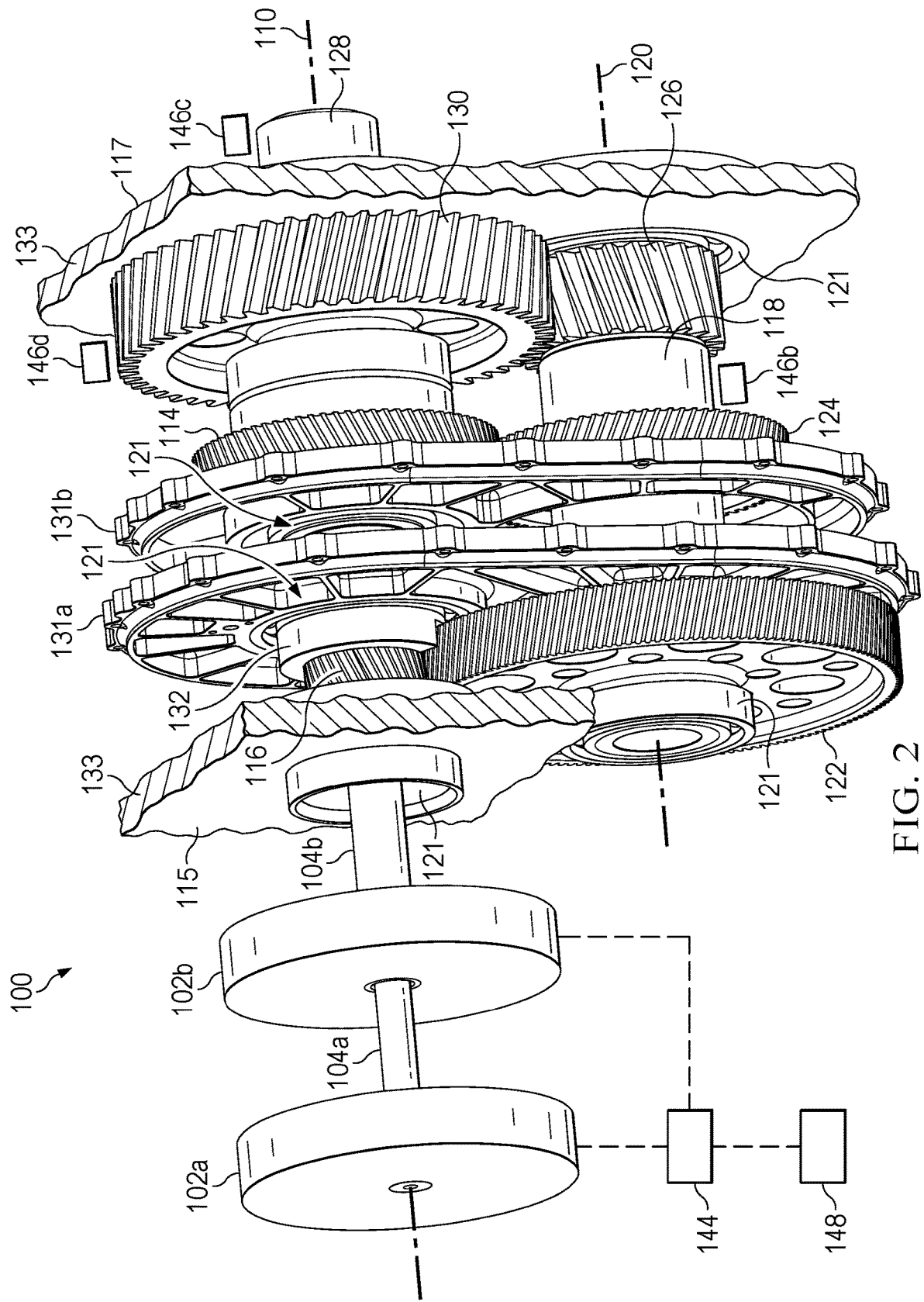

Turning to FIG. 2, another embodiment of electric drive assembly 100 is shown. In the illustrated embodiment, an assist gear 116 is disposed around assist driveshaft 104*b*. Although axially constrained along assist driveshaft 104*b*, assist gear 116 is not affixed to assist driveshaft 104*b*, but rather is disposed to rotated independently of assist driveshaft 104*b*. Assist driveshaft 104*b* may be supported by bearings 121 mounted on a first side 115 of the gearbox housing 133 and a first support plate 131*a* mounted within the gearbox housing 133 and spaced apart from first side 115. Assist driveshaft 104*b* extends through the gearbox housing 133 and is driven my second axial flux motor 102*b*. Shift mechanism 132 is shown adjacent assist gear 116 so as to permit selective engagement of shift mechanism 132 with assist gear 116 upon actuation of shift mechanism 132.

A main driveshaft 104*a* is shown extending through second axial flux motor 102*b* and assist driveshaft 104*b*. First axial flux motor 102*a* drives main driveshaft 104*a*. Affixed to main driveshaft 104*a* (or integrally formed therewith) is a main gear 114 such that rotation of main driveshaft 104*a* by first axial flux motor 102*a* in turn drives main gear 114. In the illustrated embodiment, main driveshaft 104*a* extends fully through assist driveshaft 104*b* and protrudes therefrom so that main driveshaft 104*a* can be supported by bearings 121 carried on a second support plate 131*b* mounted within the gearbox housing 133 and positioned between first support plate 131*a* and a second side 117 of gearbox housing 133. Although main gear 114 is shown mounted on main driveshaft 104*a* so that main gear 114 is positioned between second support plate 131*b* and second side 117, main gear 114 may be mounted on main driveshaft 104*a* on the opposite side of second support plat 131*b* so that main gear 114 is positioned between the first support plate 131*a* and the second support plate 131*b*.

In the illustrated embodiment, second intermediate gear 124 is carried on intermediate driveshaft 118 and is continuously meshed with main gear 114. Intermediate driveshaft 118 may be mounted on bearings 121 carried by first side 115 of gearbox housing 133, second side 117 of gearbox housing 133, and in some embodiments, by one or both support plates 131*a*, 131*b*, or any combination thereof.

Also mounted on intermediate driveshaft 118 is a first intermediate gear 122 that is continuously meshed with the assist gear 116 disposed around assist driveshaft 104*b*.

Finally, an output driveshaft 128 is shown supported between the second side 117 of gearbox housing 133 and the second support plate 131*b*. While output driveshaft 128 may also be supported by bearings 121 on second support plate 131*b*, it should be noted that output driveshaft 128 is spaced apart and separate from main driveshaft 104a. In any event, an output gear 130 is mounted on output driveshaft 128 and continuously meshed with third intermediate gear 126 carried on intermediate driveshaft 118.

A shift mechanism 132 is shown mounted adjacent assist gear 116. Shift mechanism 132 may be actuatable to selectively engage and disengage assist gear 116 with assist driveshaft 104b. When assist gear 116 is engaged with assist driveshaft 104b by shift mechanism 132, power from second axial flux motor 102b may be transferred to intermediate driveshaft 118 to assist with power from first axial flux motor 102a transferred to intermediate driveshaft 118 by main gear 114. It will be appreciated that in one or more embodiments where R3>R4>R5 and R6>R1>R2 the power from second axil flux motor 102b may be utilized to increase output torque by output driveshaft 128. Moreover, when speed of output driveshaft 130 is desired over torque, shift mechanism 132 may be actuatable to disengage assist gear 116 from assist driveshaft 104b so that only first axial flux motor 102a is driving output driveshaft 128.

One or more speed sensors 146 may be utilized to measure the timing of the driveshafts and or gears to so that the RPMs of one or both axial flux motors may be adjusted in order to facilitate engagement of assist gear 116 with assist driveshaft 104b by shift mechanism 132. Although FIG. 2 illustrates speed sensors 146b, 146c and 146d, the disclosure is not limited to a particular number of speed sensors 146 or their placement unless otherwise specifically noted.

Figure 3:
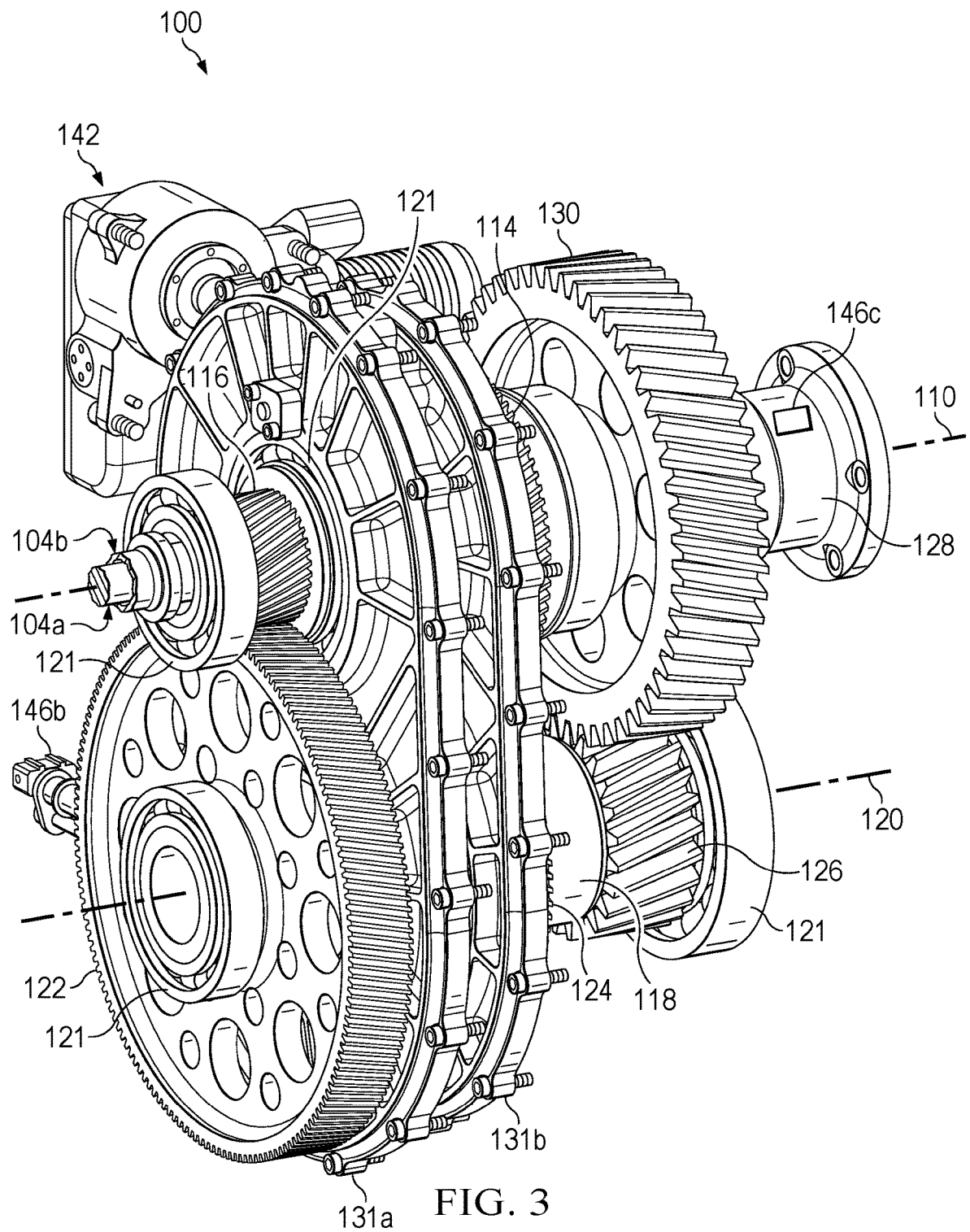

FIG. 3 is similar to FIG. 2, but with axial flux motors 102a, 102b and gearbox housing 133 removed in order to better illustrate additional components of embodiment of electric drive assembly 100. For example, although not required, in some embodiments, shift mechanism 132 may be driven by an actuator 142 (also shown in FIG. 1a). In some embodiments, actuator 142 may be an electric actuator 142 to urge shift mechanism 132 between positions, which positions include at least a first "neutral" position in which shift mechanism 132 is not engaged with a gear, and a second position in which shift mechanism 132 engages a freewheel gear, such as assist gear 116, in order to couple the freewheel gear to a driveshaft, such as assist driveshaft 104b. Some embodiments may include a third position in which shift mechanism 140 engages the main gear 114 in order to couple main gear 114 to assist driveshaft 104b in an alternative arrangement for utilizing both first and second axial flux motors 102a, 102b as a source of power for output driveshaft 128.

In FIG. 3, a speed sensor 146b is mounted adjacent the intermediate driveshaft 118 to monitor rotation of the intermediate driveshaft 118 and a speed sensor 146c is positioned adjacent the output driveshaft 128 to monitor rotation of the output driveshaft 128.

In the embodiments show in FIGS. 2 and 3, gears 114, 116, 122, 124, 126 and 130 are shown as helical gears, but may in other embodiments, different types of gears may be utilized.

Figure 4:
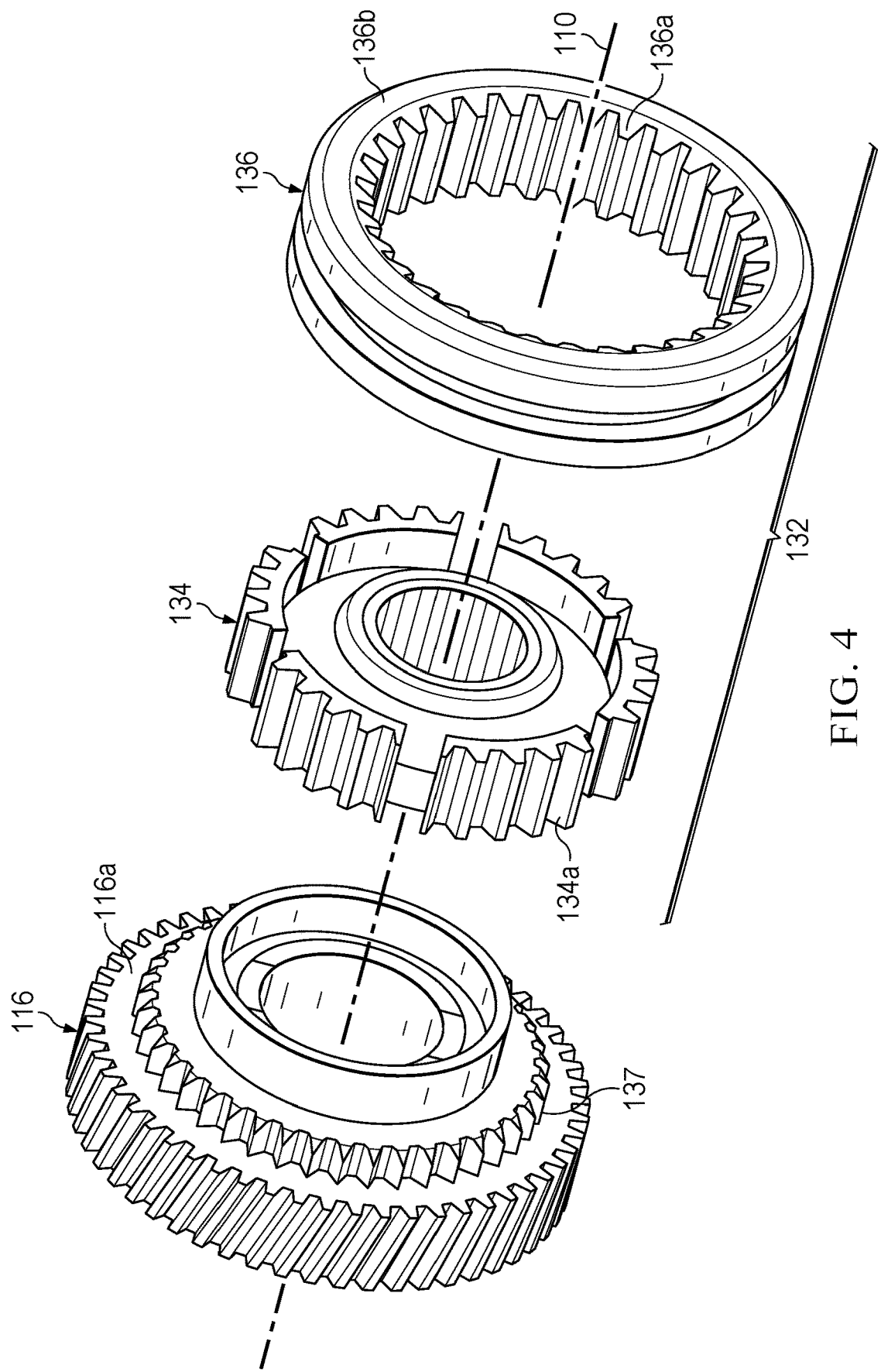

With reference back to FIG. 1a and reference to FIG. 4, while shift mechanism 132 is not limited to a particular configuration, one embodiments of shift mechanism 132 is shown in the FIG. 4. In this embodiment, shift mechanism 132 utilizes cooperating elements, such as cooperating elements 136a and 137 shown in FIG. 4, to engage one another. In particular, shift mechanism 132 includes a fixed hub 134 that is attached to assist driveshaft 104b (see FIG. 1a) so as to rotate with assist driveshaft 104b. The illustrated shift mechanism 132 also includes with a dog ring or shift sleeve 136 that is slidingly engaged with fixed hub 134. Shift sleeve 136 is axially movable relative to fixed hub 134. In one or more embodiments, shift sleeve 136 includes one or more cooperating elements 136a that engage with one or more cooperating elements 134a of fixed hub 134 in order to constrain shift sleeve 136 to axial movement along first axis 110. In some embodiments, these cooperating elements may be teeth. In the illustrated embodiment, cooperating elements 134a are formed about an exterior perimeter of fixed hub 134 and cooperating elements 136a are formed about an interior perimeter of shift sleeve 136.

In addition, the cooperating elements 136a of shift sleeve 136 may function as engagement mechanisms to allow shift sleeve 136 to couple with an adjacent gear, such as assist gear 116 described in FIG. 1a and illustrated in FIG. 4. To facilitate such coupling, the adjacent gear may also include one or more cooperating elements 137 that can be engaged by the cooperating elements 136a of shift sleeve 136. In such case, cooperating elements 136a may engage both the cooperating elements 134a of fixed hub 134 as well as the cooperating elements 137 of assist gear 116. In some embodiments, cooperating elements 136a may allow shift sleeve 136 to couple to main gear 114 when disengaged from assist gear 116. In such case, main gear 114 would likewise include cooperating elements 137 formed thereon. Similarly, rather than utilizing cooperating elements 136a formed about an interior perimeter of shift sleeve 136, cooperating elements 137 may be formed on one or both end faces 136b of shift sleeve 136 for engagement with cooperating elements 137 of a gear.

In other embodiments, shift sleeve 136 may include one or more first cooperating elements 136a disposed to engage and disengaged with assist gear 116 and one or more second cooperating elements 136a disposed to engage and disengaged with a main gear 114. In such case, cooperating elements 136a may be provided on each opposing end face 136b of shift sleeve 136. In any event, cooperating elements as described herein may include extensions, teeth, knobs, recesses, protrusions or the like so long as the cooperating elements engage one another. For example, teeth may engage teeth or protrusion may engage a recess. In one or more embodiments, the cooperating elements 137 on a gear may be disposed about a periphery or face of a gear, such as is shown on the end face 116a of assist gear 116 in FIG. 4. In the illustrated embodiment, cooperating elements 137 extend axially away from end face 116a of assist gear 116 towards shift mechanism 132. Rather than or in addition to cooperating elements around an interior perimeter of shift sleeve 136 to engage an adjacent gear, cooperating elements 136a may be formed on one or both opposing end face 136b of shift sleeve 136.

Notably, in the above-described configuration of electric drive assembly 100, the first and second axial flux motors 102a, 102b can be utilized to synchronize the rotational speeds of the assist gear 116 with the assist driveshaft 104b, eliminating the need for a traditional synchronizer ring or blocker ring of the prior art, as well as the need for a friction cone on the gear as is commonly utilized in the prior art for coupling. In the electric drive assembly 100, once the rotational speed of freewheel gear, such as the assist gear 116, and driveshaft about which it is disposed, such as the assist driveshaft 104b, have been synchronized through control of the axial flux motors 102a, 102b, shift sleeve 136 may be engaged with assist gear 116 via cooperating elements 136a and cooperating elements 137, respectively. Additionally, in some embodiments, main gear 114 may also include one or more cooperating elements 137 formed on the main gear 114 for engagement by the cooperating elements 136*a* of shift sleeve 136 when disengaged with assist gear 116, thereby allowing second axial flux motor 102*b* to assist in driving main gear 114. The foregoing eliminates the need for friction cones as is common in the prior art. It will be appreciated that by eliminating the need for traditional synchronizer rings and friction cones, the axial length and the relative weight of electric drive assembly 100 may also be reduced.

In one or more embodiments, the shift mechanism 132 is axially movable along assist driveshaft 104*b* allowing the output from the second axial flux motor 102*b* to be directed to the output driveshaft 128 through the main gear 114 and through the assist gear 116. In some embodiments, a linkage 140, such as a shift fork, may be utilized by shift mechanism 132 to move the shift mechanism 132 between a first position in which the shift mechanism 132 is engaged with one gear, a second position in which the shift mechanism 132 is disengaged from any gears and a third position in which the shift mechanism 132 is engaged with another gear. In such embodiments, at least one of the gears is a freewheel gear as described and generally depicted by assist gear 116 in FIG. 1*a*.

To optimize engagement of the coopering elements 136*a* of shift mechanism 132 with the cooperating elements 137 of assist gear 116, one or more speed sensors 146 may be disposed adjacent at least one of the shafts or gears to monitor the rotational speed of the driveshaft and/or gears. Because the position of the speed sensor 146 relative to an engagement mechanism can be fixed, the shift mechanism 132 can be shifted into full engagement without utilizing synchronizer systems of the prior art.

Referring back to FIG. 1*a*, in one or more embodiments, a single inverter 144 may be electrically coupled to each of the first and second axial flux motors 102*a*, 102*b* and the electric actuator 142 to reduce latency. In such case, the speed sensor(s) 146 may operate in collaboration with a single controller 148 controlling each of the first and second axial flux motors 102*a*, 102*b* and the electric actuator 142. Because a single inverter 144 can be utilized for both axial flux motors 102*a*, 102*b*, the need for a telematic control unit ("TCU"), which would otherwise be required to communicate with separate electrical components such as multiple inverters, as is common in the prior art, can be eliminated, thereby improving latency in the operation of the electric drive assembly 100.

It will be appreciated that the gearing ratios are flexible and may be selected for each of the gears to achieve desired results. In any event, since the main gear 114 is always engaged and driven by the first axial flux motor 102*a*, there is not a drop off or torque interrupt as the shift mechanism 132 is shifted to utilize output from the second axial flux motor 102*b*, whether through the main gear 114 or through the assist gear 116. It is the two separate axial flux motors 102*a*, 102*b*, along with the described constantly engaged gearing mechanisms, that permit torque interrupt to be mitigated as described. In any event, because the main gear 114 is always engaged and driving when first axial flux motor 102*a* is in operation, there is no drop-off in speed of the main gear 114 as the shift mechanism 132 is shifted to engage or disengage the assist gear 116.

In one or more embodiments, a speed sensor 146*b* is mounted adjacent the intermediate driveshaft 118 to monitor rotation of the intermediate driveshaft 118. It will be appreciated that the shift mechanism 132, and in particular, shift sleeve 136, may include one or more engagement mechanisms or cooperating elements, such as teeth, extensions, knobs, recesses, protrusions or the like, that are disposed to couple with corresponding cooperating elements on the assist gear 116 and, in some embodiments, also on the main gear 114. By knowing the rotational speed of intermediate driveshaft 118, the gears 116, 114 can be fully engaged without torque interrupt or the need for any intermediate friction coupling utilizing friction cones. This synchronization is derived from the one or more of the speed sensors 146. Once the overall electric drive assembly 100 is assembled, the relative relationship or positions between main gear, the assist gear, the intermediate gears, and the output gear are fixed and do not change over time. Knowing the rotational speed of the intermediate driveshaft (or another component of the main, intermediate or output systems), therefore, permits the speed of the second axial flux motor 102*b* to be adjusted accordingly to synchronize engagement of the shift mechanism 132 with either of the main gear 114 or the assist gear 116.

Turning to another novel aspect of above-described electric drive assembly 100, the presence of two axial flux motors 102*a*, 102*b* permits one of the axial flux motors 102 to be utilized for electricity generation when the electric drive assembly 100 is switches from a speed mode to a torque mode. Specifically, it will be appreciated that at times, a particular gearing ratio may be desired only utilizing the assist gear 116. In such case, because main gear 114 is always engaged with second intermediate gear 124 such that main driveshaft 104*a* is always in motion, first axial flux motor 102*a* driven by main driveshaft 104*a* can be utilized in a regeneration mode to generate electricity as an alternator, much in the same way rotational speed/torque bled off through either driveshaft 104 could be used to drive an axial flux motor 102 to generate electricity. In one or more embodiments where electricity is generated from one of the axial flux motors 102*a*, 102*b*, inverter 144 may also be utilized to manage the generated electricity. It will be appreciated that the larger the electrical pulse resulting from regeneration (which may occur when transitioning from high-speed mode utilizing first axial flux motor 102*a* to high torque mode utilizing second axial flux motor 102*b*), the longer period of time that is required in order to dampen or bleed off the electricity generated from axial flux motor 102*a*. Moreover, the larger the pulse, the greater the amount of heat that may be managed by the inverter 144, which may be necessary to avoid overheating of various electrical components. Thus, there is a desire to minimize the regeneration mode of the axial flux motors during a gear transition between torque and power modes of electric drive assembly 100.

Figure 5:
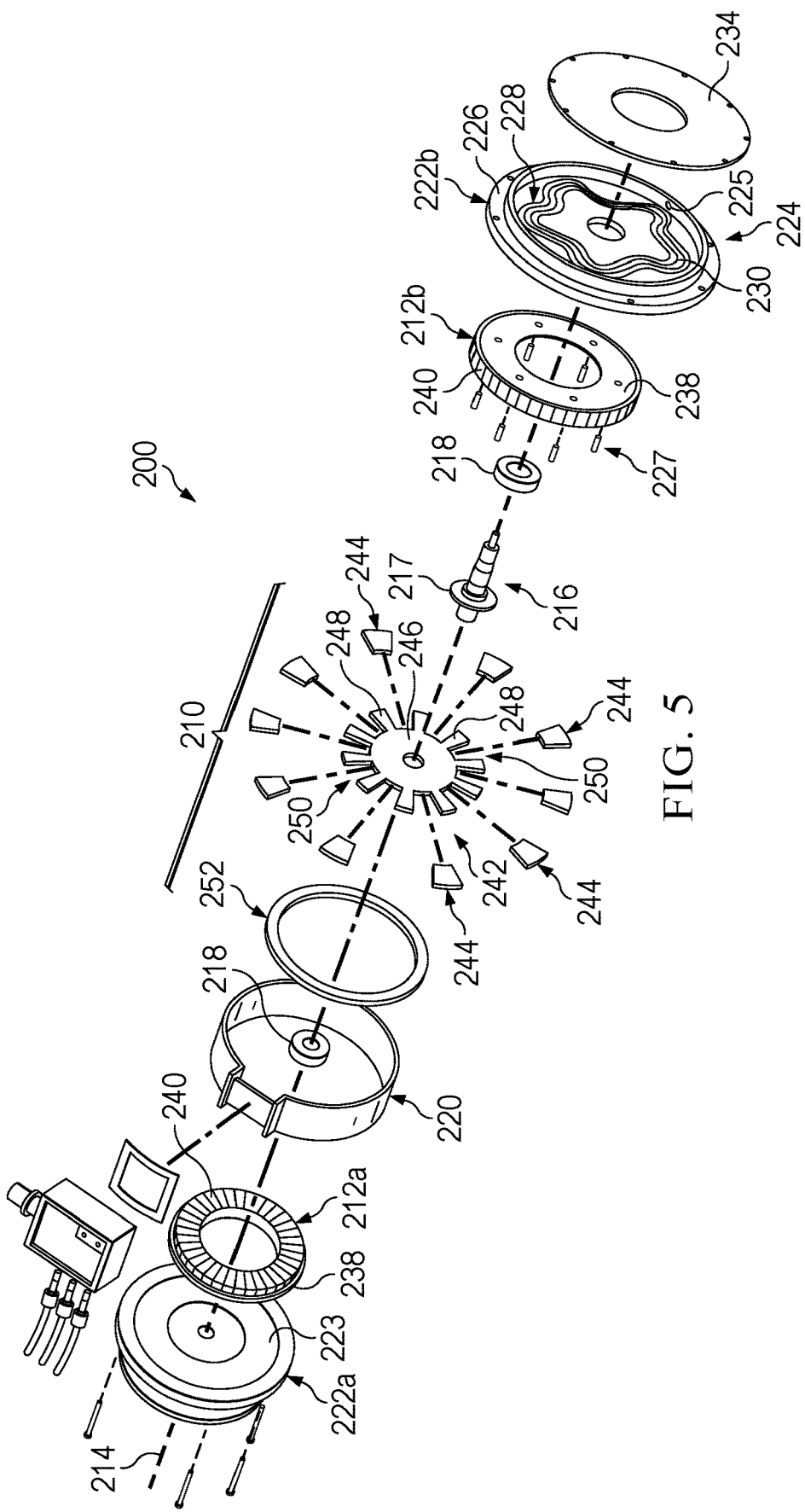

Turning to FIG. 5, to minimize regeneration from axial flux motors 102 during a gear transition between torque and power modes, in one or more embodiments, one or both axial flux motors 102 include rotor assemblies with non-magnetic components that are constructed primarily of non-conducting materials, such as composite or polymers in order to reduce weight of the rotor assemblies. Such construction minimizes the energy pulse dampening of the motors before synchronization as described above. Thus, for example, referring to FIG. 5, there is shown an axial flux type electric motor assembly 200. Electric motor assembly 200 includes at least one rotor assembly 210 and at least one stator assembly 212 disposed axially from one another along a motor axis 214. In the illustrated embodiment, a rotor spindle or driveshaft 216 extends along axis 214 and supports rotor assembly 210. Rotor driveshaft 216 may include a spindle flange 217 that attaches to rotor assembly 210. Rotor driveshaft 216 may in turn be supported by one or more bearings 218.

Although only a single stator assembly 212 may be utilized, in the illustrated embodiment, two stator assemblies 212a, 212b are shown and positioned on opposing sides of single rotor assembly 210 along axis 214. It will be appreciated that by minimizing the number of rotor assemblies, the overall weight of axial flux motor 200, particularly as used in electric drive assembly 100, may be minimized to minimizes the need for energy pulse dampening when alternating between speed mode and torque mode as described above. In this regard, the gearing arrangement of electric drive assembly 100 as described herein is particularly suited for a pair of single rotor axial flux motors as described in some embodiments because each of the axial flux motors may be utilized as needed to achieve a desired output without while limiting the potential energy pulse that could result from rotors with larger mass and inertia.

A motor housing 220 and opposing stator support or end plates 222 enclose rotor assembly 210 and the one or more stator assemblies 212. In one or more embodiments, at least one end plate 222 supports a stator assembly 212 on an interior surface 223 of the end plate 222. In the illustrated embodiment, end plate 222a supports stator assembly 212a and end plate 222b supports stator assembly 212b.

To the extent an end plate 222 supports a stator assembly 212, the end plate 222 may include cooling a cooling mechanism 224 positioned along the exterior surface 226 of the end plate 222.

In one or more embodiments, cooling mechanism 224 may form one or more coolant flow paths 228 along the exterior surface 226 of end plate 222. Coolant flow path 228 may be one or more cooling channels 230 formed in the exterior surface 226 of end plate 222.

In the illustrated embodiment, a plurality of fluidically connected cooling channels 230 are illustrated and are generally positioned to extend around the end plate 222 opposite the stator assembly 212 mounted on the interior surface 223 of end plate 222. Although not limited to a particular configuration, in one embodiment, cooling channels 230 may form star shape along the exterior surface 226 to maximize cooling while allowing fasteners 227 to secure various motor components to end plate 222 from the interior surface 223 without extending through end plate 222 to the exterior surface 226 of end plate 222. In other words, threaded bores for engagement by fasteners 227 may be formed on the interior surface 223 of end plate 222, but the bores do not extend all the way through end plate 222. It will be appreciated that such an arrangement minimizes the likelihood that fluid within the interior of motor assembly 200 could leak or migrate out or that vice-versa. In other embodiments, coolant flow path 228 may be formed of tubing (not shown) positioned on the exterior surface 226. In yet other embodiments, coolant flow path 228 may be formed of ribs or fins (now shown) extending from exterior surface 228, while in other embodiments, coolant flow path 228 may simply be a coolant chamber formed between end plate 222 and an outer plate 234. Notwithstanding the foregoing, it will be appreciated that cooling channels 230 formed in the exterior surface 226 of end plate 222 may be particularly desirable to minimize the overall axial length of electric motor assembly 200. In any event, one or more ports 225 in fluid communication with flow path 228 may be utilized to introduce and extracted coolant from the from cooling mechanism 224.

Each stator assembly 212 is generally formed of a stator core 238 and stator windings 240 as may be known to persons of skill in the art. In this regard, stator windings 240 may be formed of electric wire. The disclosure is not limited to a particular configuration for stator assembly 212.

Figure 6:
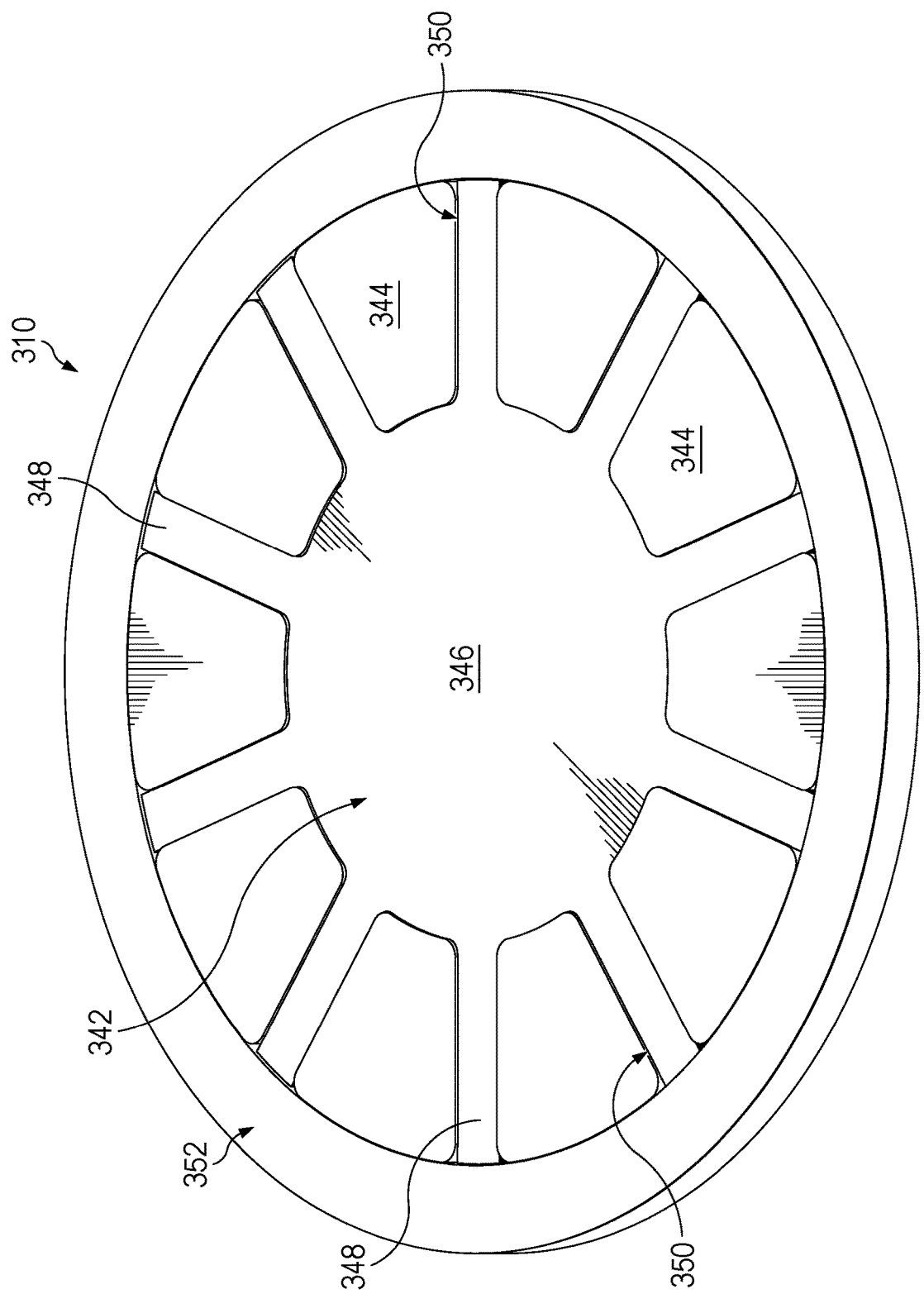
FIG. 6 is a perspective view of a rotor assembly of the axial flux electric motor of FIG. 5.
Figure 7:
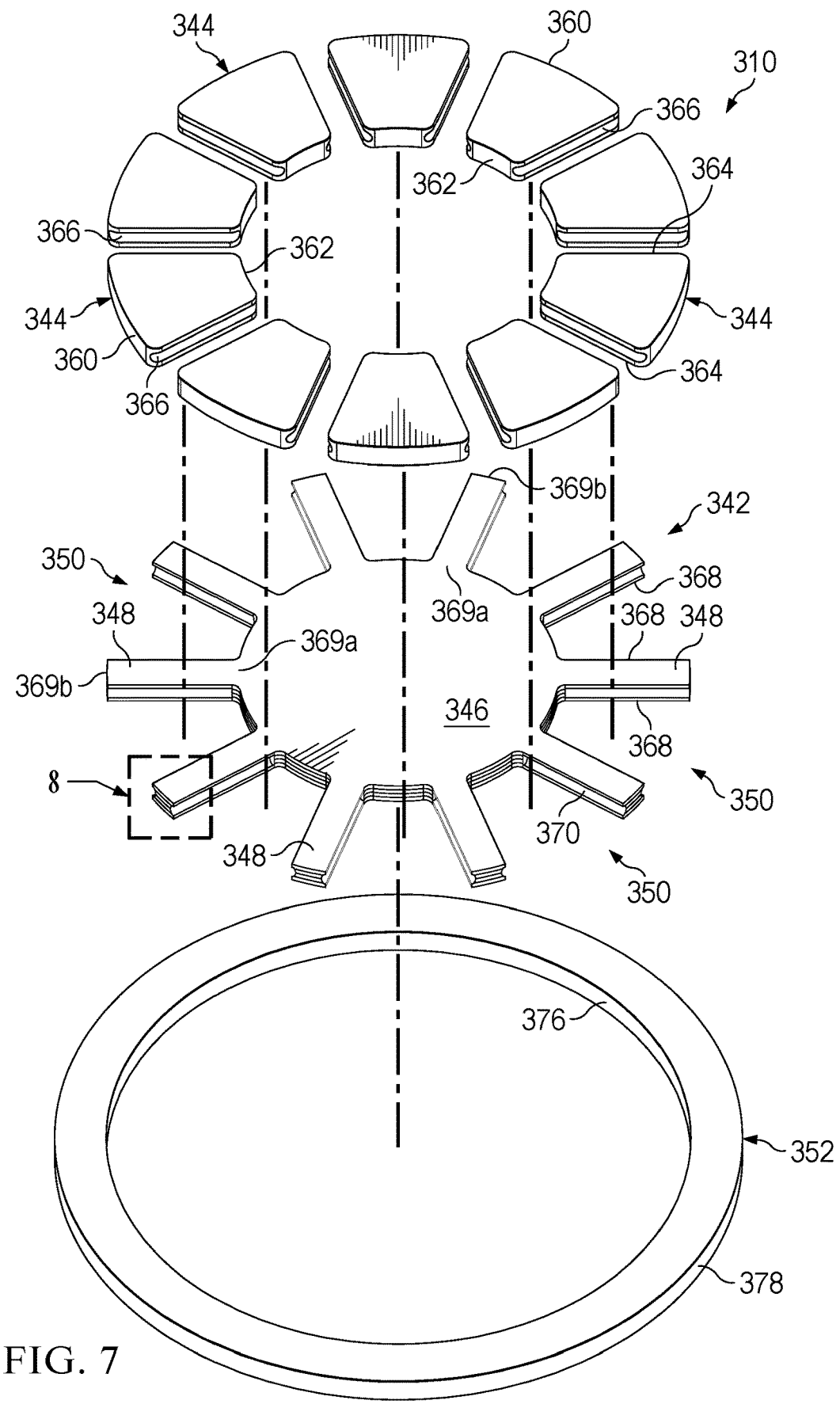
FIG. 7 is an exploded perspective view of the rotor assembly of FIG. 6.

With reference to FIGS. 6 and 7 and ongoing reference to FIG. 5, rotor assembly 210 is generally formed of a rotor core or yoke 242 disposed to carry a plurality of magnets 244. In one or more embodiments, rotor core 242 is spider shaped and formed of a hub 246 from which fingers 248 radially extend. Fingers 248 are spaced apart from one another around the perimeter of hub 246 so as to form magnet pockets 250 between adjacent fingers 248. In one or more embodiments, rotor assembly 210 further includes a rotor ring 252 disposed radially outward from fingers 248. In one or more embodiments, rotor ring 252 and rotor core 242 may be separate components, such as is shown in FIGS. 1, 2A and 2B, while in other embodiments, rotor ring 252 and rotor core 242 may be integrally formed.

In one or more embodiments, rotor core 242 is formed of a non-conducting composite material. Similarly, in one or more embodiments, rotor ring 252 is formed of a non-conducting composite material.

Turning to FIGS. 6-7, embodiments of a rotor assembly 210 are shown and generally described as rotor assembly 310. Rotor assembly 310 generally includes a rotor core or yoke 342 disposed to carry a plurality of magnets 344. In one or more embodiments, rotor core 342 is spider shaped and formed of a hub 346 from which fingers 348 radially extend. Fingers 348 are spaced apart from one another around the perimeter of hub 346 so as to form magnet pockets 350 between adjacent fingers 348. Rotor assembly further includes a rotor ring 352 disposed radially outward from fingers 348. Although not limited to a particular number of fingers 348 and pockets 350, in the illustrated embodiment, rotor core 342 includes ten fingers 348 and ten magnet pockets 350.

In the illustrated embodiment of rotor assembly 310, fingers 348 are generally rectangular in shape so that magnet pockets 350 are generally wedge shaped.

As such, in this illustrated embodiment, magnets 344 are generally wedge shaped, where each magnet 344 has a radially outer edge 360 of a greater length than a radially inner edge 362 which edges 360, 362 are joined by side edges 364. In one or more embodiments, as best seen in FIG. 8B, at least one and preferably each side edge 364 of a magnet 344 includes a groove or slot 366 extending along at least a portion of the length of side edge 364 between radially outer edge 360 and radially inner edge 362. In one or more embodiments, each groove 366 fully extends between radially outer edge 360 and radially inner edge 362, while in other embodiments groove 366 extends from radially outer edge 360 and is spaced apart from radially inner edge 362. In yet other embodiments, groove 366 is spaced apart from radially outer edge 360 and extends from radially inner edge 362. Finally in other embodiments, groove 366 is formed alongside edge 364 to be spaced apart from both radially outer edge 360 and radially inner edge 362.

Similarly, each finger 348 of hub 346 has a side edge 368 that extends from a proximal end 369a adjacent the hub 346 to a distal end 369b at the periphery of the rotor core 342. In one or more embodiments, the side edges 368 of each finger may be generally smooth without any feature formed therealong. In one or more other embodiments, each side edge 368 of a finger 348 includes a groove or slot 370 extending along at least a portion of the length of side edge 368 between the proximal end 369*a* and the distal end 369*b* of finger 348.

In one or more embodiments, each groove 370 fully extends between the proximal end 369*a* and the distal end 369*b* of finger 348, while in other embodiments groove 370 extends from distal end 369*b* and is spaced apart from proximal end 369*a*. In yet other embodiments, groove 370 is spaced apart from distal end 369*b* and extends from proximal end 369*a*. Finally in other embodiments, groove 370 is formed alongside edge 368 to be spaced apart from both the distal end 369*b* and the proximal end 369*a* of finger 348.

In one or more embodiments, rotor ring 352 is a preformed ring that is positioned around rotor core 342. In some embodiments, rotor ring 352 is a continuous, solid ring. In this regard, rotor ring 352 may be formed of a composite material, such as a fiber material. Rotor ring 352 has a radially inner edge 376 and a radially outer edge 378, where radially inner edge 376 may abut fingers 348 when positioned around rotor core 342. In one or more embodiments, the radially inner edge 376 of solid, pre-formed rotor ring 352 is formed. As will be appreciated, each of the carbon fiber material and glass fiber material may be formed of a substrate on which the fibers are carried.

Figure 8:
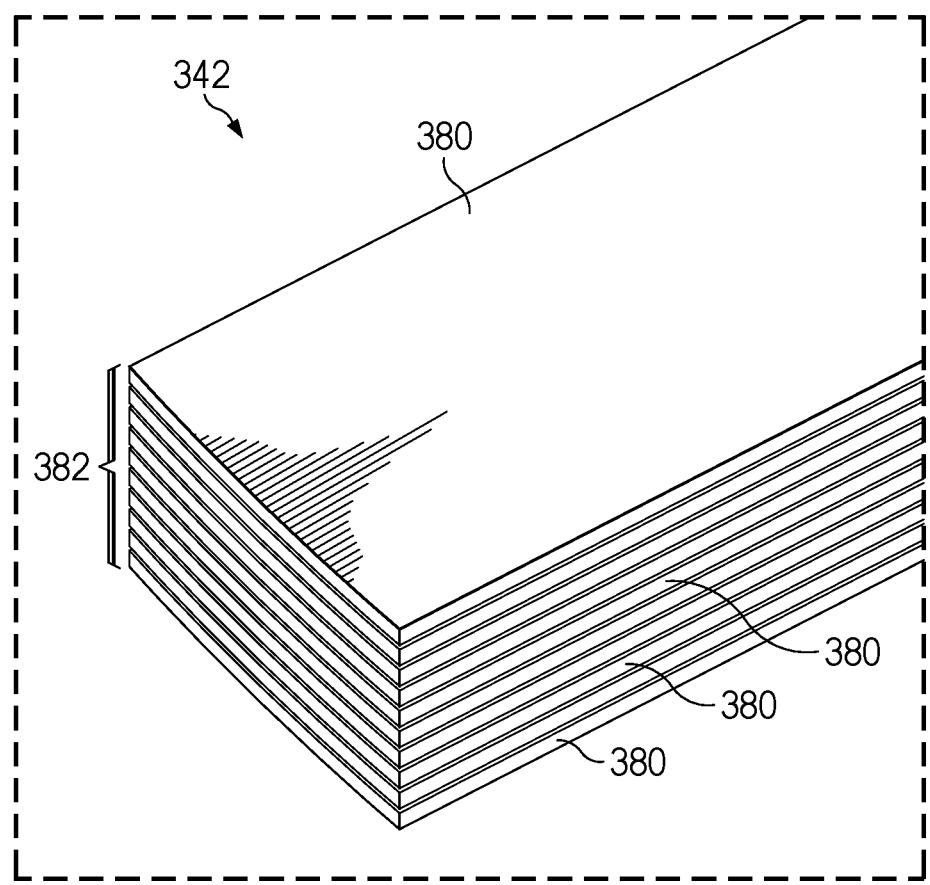
FIG. 8 an enlarge perspective view of a portion of the rotor core of FIG. 7 illustrating the layered construction of the rotor core.

Turning to FIG. 8, in one or more embodiments, rotor core or yoke 342 may be formed of a multiplicity of layers 380 of fiber material arranged in a stack 382 or "book" as shown. Each fiber layer 380 may be a material having a set of primary fibers. Individual layers 280 are formed into the stack 282.

Thus, an electric drive assembly has been described. In one or more embodiments, the electric drive assembly includes a first axial flux motor; a main driveshaft with a first end and a second end, the main driveshaft disposed along a first axis and coupled to the first axial flux motor; a second axial flux motor positioned adjacent the first axial flux motor; an assist driveshaft with a first end and a second end, wherein the assist driveshaft is hollow with an outer driveshaft surface and an inner bore passing therethrough between the first and second ends of the assist driveshaft, the assist driveshaft coupled to the second axial flux motor, wherein the main driveshaft passes through the assist driveshaft so as to be coaxial therewith; a main gear fixed to the main driveshaft; an assist gear mounted along the assist driveshaft and rotatable relative to the assist driveshaft; an intermediate driveshaft extending along a second axis, the intermediate driveshaft parallel with but spaced apart from the first axis; a first intermediate gear mounted on the intermediate driveshaft and continuously meshed with the assist gear; a second intermediate gear mounted on the intermediate driveshaft and continuously meshed with the main gear; a third intermediate gear mounted on the intermediate driveshaft; an output driveshaft disposed along the first axis but spaced apart from the first and second drive shafts; an output gear fixed to the output driveshaft and continuously meshed with the third intermediate gear; and a shift mechanism mounted along the assist driveshaft and axially movable along the assist driveshaft between the main gear and the assist gear. In one or more other embodiments, the electric drive assembly may include a first axial flux motor; a main driveshaft with a first end and a second end, the main driveshaft disposed along a first axis and coupled to the first axial flux motor; a second axial flux motor positioned adjacent the first axial flux motor; an assist driveshaft with a first end and a second end, wherein the assist driveshaft has an inner bore passing therethrough between the first and second ends of the assist driveshaft and an outer driveshaft surface on which a guide mechanism 150 is formed, the assist driveshaft coupled to the second axial flux motor, wherein the main driveshaft passes through the assist driveshaft so as to be coaxial therewith; a main gear fixed to the main driveshaft, the main gear including a first face and an opposing second face and an outer peripheral surface along which radially extending teeth are formed, with a first axial engagement mechanism formed on the first face adjacent the outer peripheral surface of the main gear; an assist gear mounted along the assist driveshaft and rotatable relative to the outer driveshaft surface of the assist driveshaft, the assist gear including a first face and an opposing second face and an outer peripheral surface along which radially extending teeth are formed, with a second axial engagement mechanism formed on the second face adjacent the outer peripheral surface of the assist gear; an intermediate driveshaft extending along a second axis, the intermediate driveshaft parallel with but spaced apart from the first axis; a first intermediate gear mounted on the intermediate driveshaft and continuously meshed with the assist gear; a second intermediate gear mounted on the intermediate driveshaft and continuously meshed with the main gear; a third intermediate gear mounted on the intermediate driveshaft; an output driveshaft disposed along the first axis but spaced apart from the first and second drive shafts; an output gear fixed to the output driveshaft and continuously meshed with the third intermediate gear; and a dog ring coupled to the assist driveshaft and axially movable along the assist driveshaft between the main gear and the assist gear, wherein the dog ring has a central aperture with a radially extending notch that engages the guide mechanism of the assist driveshaft, and an engagement mechanism disposed to couple with one of the first axial engagement mechanism or the second axial engagement mechanism. In one or more other embodiments, the electric drive assembly may include a first axial flux motor comprising a single, non-metallic rotor; a main driveshaft with a first end and a second end, the main driveshaft disposed along a first axis and coupled to the first axial flux motor; a second axial flux motor positioned adjacent the first axial flux motor, the second axial flux motor comprising a single, non-metallic rotor; an assist driveshaft with a first end and a second end, wherein the assist driveshaft has an inner bore passing therethrough between the first and second ends of the assist driveshaft and an outer driveshaft surface, the assist driveshaft coupled to the second axial flux motor, wherein the main driveshaft passes through the assist driveshaft so as to be coaxial therewith; a main gear fixed to the main driveshaft, the main gear including a first face and an opposing second face and an outer peripheral surface along which radially extending teeth are formed, with a first axial engagement mechanism formed on the first face adjacent the outer peripheral surface of the main gear; an assist gear mounted along the assist driveshaft and rotatable relative to the outer driveshaft surface of the assist driveshaft, the assist gear including a first face and an opposing second face and an outer peripheral surface along which radially extending teeth are formed, with a second axial engagement mechanism formed on the second face adjacent the outer peripheral surface of the assist gear; an intermediate driveshaft extending along a second axis, the intermediate driveshaft parallel with but spaced apart from the first axis; a first intermediate gear mounted on the intermediate driveshaft and continuously meshed with the assist gear; a second intermediate gear mounted on the intermediate driveshaft and continuously meshed with the main gear; a third intermediate gear mounted on the intermediate driveshaft; an output driveshaft disposed along the first axis but spaced apart from the first and second drive shafts; an output gear fixed to the output driveshaft and continuously meshed with the third intermediate gear; a dog ring slidingly coupled to the assist driveshaft and axially movable along the assist driveshaft between the main gear and the assist gear, and an engagement mechanism disposed to couple with one of the first axial engagement mechanism or the second axial engagement mechanism; a shift mechanism disposed to move the dog ring axially along the outer surface of the assist driveshaft, the shift mechanism including an electric actuator; a first speed sensor disposed adjacent one of the shafts to monitor the rotational speed of the shafts; a single inverter electrically coupled to each of the first and second axial flux motors and the electric actuator; and a single controller controlling each of the first and second axial flux motors and the electric actuator. In one or more other embodiments, the electric drive assembly is a two-speed electric drive assembly that includes a main driveshaft with a main gear disposed along the main driveshaft; a first axial flux motor coupled to the main driveshaft and disposed to rotate the main driveshaft; an assist driveshaft with an assist gear disposed along the assist driveshaft; a second axial flux motor coupled to the assist driveshaft and disposed to rotate the assist driveshaft; an intermediate driveshaft with first, second and third intermediate gears each disposed along the intermediate driveshaft, wherein the third intermediate gear is fixed to the intermediate driveshaft; and an output driveshaft with an output gear affixed to the output driveshaft; wherein the main gear is continuously meshed with the second intermediate gear; wherein the assist gear is continuously meshed with the first intermediate gear; wherein the output gear is continuously meshed with the third intermediate gear; and wherein one of the main gear, assist gear, first intermediate gear or second intermediate gear is a freewheel gear disposed to be rotatable independently from the driveshaft about which it is mounted.

For any of the foregoing embodiments, the rotor assembly may include any one of the following elements, alone or in combination with each other:

- The first axial flux motor is adjacent the second axial flux motor.
- The main driveshaft extends through and is coaxial with the assist driveshaft.
- A first axial flux motor coupled to the main driveshaft.
- A second axial flux motor coupled to the assist driveshaft.
- A shift mechanism disposed adjacent the freewheel gear and axially movable to couple and decouple the freewheel gear and the driveshaft about which the freewheel gear is mounted.
- The shift mechanism comprises a hub affixed to a driveshaft and a shift sleeve slidingly engaged with the fixed hub.
- The output driveshaft is colinear with the main driveshaft and hollow assist driveshaft.
- The assist driveshaft is hollow and the main driveshaft coaxially extends through the assist driveshaft.
- The intermediate driveshaft is parallel with the main driveshaft and the assist driveshaft.
- The main driveshaft extends along a first axis and the intermediate driveshaft extends along a second axis spaced apart from the main first axis.
- The assist gear is the freewheel gear.
- The main gear is the freewheel gear.
- The first intermediate gear is the freewheel gear.
- The second intermediate gear is the freewheel gear.
- One or more bearings disposed between the assist gear and the assist driveshaft to permit the assist gear to rotated about the first axis independently of the assist driveshaft.
- The assist gear is the freewheel gear, the electric drive assembly further comprising a plurality of cooperating elements disposed on the assist gear and a plurality of cooperating elements disposed on the shift mechanism disposed to engage the plurality of cooperating elements disposed on the assist gear.
- A first speed sensor disposed adjacent the intermediate driveshaft to monitor the rotational speed of the intermediate driveshaft.
- A first speed sensor disposed adjacent one of the shafts to monitor the rotational speed of the shafts.
- A first speed sensor disposed adjacent the assist driveshaft to monitor the rotational speed of the assist driveshaft.
- The first speed sensor is electrically coupled to the actuator.
- A second speed sensor disposed adjacent the dog ring.
- A first speed sensor disposed adjacent the assist driveshaft to monitor the rotational speed of the assist driveshaft and a second speed sensor disposed adjacent the one of the main driveshaft or the first main gear.
- A single inverter electrically coupled to each of the first and second axial flux motors and the electric actuator.
- A single controller controlling each of the first and second axial flux motors and the electric actuator.
- The first axial flux motor comprises only a single rotor.
- The second axial flux motor comprises only a single rotor.
- The first and second axial flux motors each comprise only a single rotor.
- The first axial flux motor comprises a non-metal rotor.
- The second axial flux motor comprises a non-metal rotor.
- The first and second axial flux motors each comprise a non-metal rotor.
- The first and second axial flux motors each comprise a single rotor positioned between two stators.
- The output driveshaft is parallel with the intermediate driveshaft.
- The main driveshaft, the hollow assist driveshaft, the intermediate driveshaft and the output driveshaft are all spatially fixed relative to one another within the gearbox housing.
- A gearbox housing within which the gears and driveshafts are mounted, wherein the axial flux motors are external of the of the gearbox housing.
- Two or more first axial flux motors coupled to the main driveshaft.
- Two or more second axial flux motors coupled to the assist driveshaft.
- A first support plate and a second support plate disposed within the gearbox housing, wherein the assist driveshaft is supported by the gearbox housing and the first support plate, wherein the output driveshaft is supported by the gearbox housing and the second support plate, and wherein the main driveshaft extends from the assist driveshaft and is supported by the second support plate.
- The intermediate driveshaft is supported by the first and second support plates.
- The intermediate driveshaft is supported by the gearbox housing.
- Main gear has a first radius R1; assist gear has a second radius R2; first intermediate gear has a third radius R3;

second intermediate gear has a fourth radius R4; third intermediate gear has a fifth radius R5; and output gear has a sixth radius R6.

R3 is greater than R4, which is greater than R5 and R6 is greater than R1 which is greater than R2.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

The invention claimed is:

1. An electric drive assembly comprising:
a main driveshaft with a main gear disposed along the main driveshaft;
a first axial flux motor coupled to the main driveshaft and disposed to rotate the main driveshaft;
an assist driveshaft with an assist gear disposed along the assist driveshaft;
a second axial flux motor coupled to the assist driveshaft and disposed to rotate the assist driveshaft;
an intermediate driveshaft with first, second and third intermediate gears each disposed along the intermediate driveshaft, wherein the third intermediate gear is fixed to the intermediate driveshaft; and
an output driveshaft with an output gear affixed to the output driveshaft;
wherein the main gear is continuously meshed with the second intermediate gear;
wherein the assist gear is continuously meshed with the first intermediate gear;
wherein the output gear is continuously meshed with the third intermediate gear;
wherein one of the main gear, assist gear, first intermediate gear or second intermediate gear is a freewheel gear disposed to be rotatable independently from the driveshaft about which it is mounted.

2. The electric drive assembly of claim 1, further comprising a shift mechanism disposed adjacent the freewheel gear and axially movable to couple and decouple the freewheel gear and the driveshaft about which the freewheel gear is mounted.

3. The electric drive assembly of claim 2, further comprising one or more bearings disposed between the assist gear and the assist driveshaft to permit the assist gear to rotated about the first axis independently of the assist driveshaft.

4. The electric drive assembly of claim 2, wherein the assist gear is the freewheel gear, the electric drive assembly further comprising a plurality of cooperating elements disposed on the assist gear and a plurality of cooperating elements disposed on the shift mechanism disposed to engage the plurality of cooperating elements disposed on the assist gear.

5. The electric drive assembly of claim 1, wherein the assist driveshaft is hollow and the main driveshaft coaxially extends through the assist driveshaft.

6. The electric drive assembly of claim 5, wherein the main driveshaft extends along a first axis and the intermediate driveshaft extends along a second axis spaced apart from the main first axis.

7. The electric drive assembly of claim 6, wherein the assist gear is the freewheel gear.

8. A two-speed electric drive assembly comprising:
a first axial flux motor;
a main driveshaft with a first end and a second end, the main driveshaft disposed along a first axis and coupled to the first axial flux motor;
a second axial flux motor positioned adjacent the first axial flux motor;
an assist driveshaft with a first end and a second end, wherein the assist driveshaft is hollow with an outer driveshaft surface and an inner bore passing therethrough between the first and second ends of the assist driveshaft, the assist driveshaft coupled to the second axial flux motor, wherein the main driveshaft passes through the assist driveshaft so as to be coaxial therewith;
a main gear fixed to the main driveshaft;
an assist gear mounted along the assist driveshaft and rotatable independently of the assist driveshaft;
an intermediate driveshaft extending along a second axis, the intermediate driveshaft parallel with but spaced apart from the first axis;
a first intermediate gear mounted on the intermediate driveshaft and permanently meshed with the assist gear;
a second intermediate gear mounted on the intermediate driveshaft and permanently meshed with the main gear;
a third intermediate gear mounted on the intermediate driveshaft;
an output driveshaft disposed along the first axis but spaced apart from the first and second drive shafts;
an output gear fixed to the output driveshaft and permanently meshed with the third intermediate gear; and
a shift mechanism mounted along the assist driveshaft and axially movable along the assist driveshaft between the main gear and the assist gear.

9. The two-speed electric drive assembly of claim 8, wherein the main gear has a first radius R1; the assist gear has a second radius R2; the first intermediate gear has a third radius R3; the second intermediate gear has a fourth radius R4; the third intermediate gear has a fifth radius R5; and the output gear has a sixth radius R6, wherein R3 is greater than R4, which is greater than R5, and wherein R6 is greater than R1 which is greater than R2.

10. The two-speed electric drive assembly of claim 8, further comprising a gearbox housing with a first support plate and a second support plate disposed within the gearbox housing, wherein the assist driveshaft is supported by the gearbox housing and the first support plate, wherein the output driveshaft is supported by the gearbox housing and the second support plate, and wherein the main driveshaft extends from the assist driveshaft and is supported by the second support plate.

11. The two-speed electric drive assembly of claim 10, wherein the intermediate driveshaft is supported by the gearbox housing.

12. The two-speed electric drive assembly of claim 8, further comprising an electric actuator disposed to actuate the shift mechanism, and a single inverter electrically coupled to each of the first and second axial flux motors and the electric actuator.

13. The two-speed electric drive assembly of claim 12, further comprising a single controller controlling the single inverter.

14. The two-speed electric drive assembly of claim 13, further comprising a first speed sensor disposed adjacent the assist driveshaft to monitor the rotational speed of the assist driveshaft and a second speed sensor disposed adjacent the one of the main driveshaft, the first main gear, the intermediate driveshaft or an intermediate gear to monitor the rotational speed of the assist gear.

15. An electric drive assembly comprising:
a first axial flux motor;
a main driveshaft with a first end and a second end, the main driveshaft disposed along a first axis and coupled to the first axial flux motor;
a second axial flux motor;
an assist driveshaft with a first end and a second end, the assist driveshaft disposed along the first axis and coupled to the second axial flux motor;
a main gear disposed about the main driveshaft;
an assist gear disposed about the assist driveshaft, wherein one of the main gear or assist gear is a freewheel gear that is rotatable independently of the driveshaft along which it is disposed;
an intermediate driveshaft extending along a second axis, which second axis is parallel with but spaced apart from the first axis;
a first intermediate gear disposed about the intermediate driveshaft and permanently meshed with the assist gear;
a second intermediate gear disposed about the intermediate driveshaft and permanently meshed with the main gear;
a third intermediate gear mounted on the intermediate driveshaft;
an output driveshaft spaced apart from the main and assist driveshafts;
an output gear fixed to the output driveshaft and permanently meshed with the third intermediate gear; and
a shift mechanism mounted adjacent the freewheel gear and axially movable along the first axis from a first position in which the shift mechanism is engaged with the freewheel gear to couple the freewheel gear to the driveshaft on which the freewheel gear is mounted and a second position where the shift mechanism is disengaged with the freewheel gear.

16. The electric drive assembly of claim 15, further comprising an electric actuator disposed to actuate the shift mechanism, a single inverter electrically coupled to each of the first and second axial flux motors and the electric actuator, and a controller controlling the single inverter.

17. The electric drive assembly of claim 16, further comprising a first speed sensor disposed adjacent the assist driveshaft to monitor the rotational speed of the assist driveshaft and a second speed sensor disposed adjacent the one of the main driveshaft, the first main gear, the intermediate driveshaft or an intermediate gear to monitor the rotational speed of the assist gear.

18. The electric drive assembly of claim 16, wherein the first axial flux motor comprises only a single rotor.

19. The electric drive assembly of claim 16, wherein the first and second axial flux motors each comprise only a single rotor.

20. The electric drive assembly of claim 19, wherein the first and second axial flux motors each comprise a non-metal rotor.

* * * * *